United States Patent
Tsubouchi et al.

(10) Patent No.: US 8,387,826 B2
(45) Date of Patent: Mar. 5, 2013

(54) BEVERAGE DISPENSING APPARATUS

(75) Inventors: Syunji Tsubouchi, Aichi-ken (JP); Eiji Hara, Aichi-ken (JP); Fumitaka Saitou, Aichi-ken (JP)

(73) Assignee: Hoshizaki Denki Kabushiki Kaisha, Aichi-Ken (JP)

( * ) Notice: Subject to any disclaimer, the term of this patent is extended or adjusted under 35 U.S.C. 154(b) by 1029 days.

(21) Appl. No.: 12/309,406

(22) PCT Filed: Jul. 13, 2007

(86) PCT No.: PCT/JP2007/063961
§ 371 (c)(1),
(2), (4) Date: Mar. 11, 2009

(87) PCT Pub. No.: WO2008/010454
PCT Pub. Date: Jan. 24, 2008

(65) Prior Publication Data
US 2009/0194564 A1 Aug. 6, 2009

(30) Foreign Application Priority Data
Jul. 20, 2006 (JP) .................................. 2006-197718

(51) Int. Cl.
*B67D 7/06* (2010.01)
(52) U.S. Cl. ......... 222/23; 222/399; 222/146.6; 222/54; 222/61; 62/3.64; 62/389
(58) Field of Classification Search .................. 62/3.64, 62/389; 222/23, 146.1, 146.6, 399, 54, 61
See application file for complete search history.

(56) References Cited

U.S. PATENT DOCUMENTS

| | | | | |
|---|---|---|---|---|
| 5,303,845 A | * | 4/1994 | Osawa | 222/1 |
| 5,335,705 A | * | 8/1994 | Morishita et al. | 141/275 |
| 5,730,323 A | * | 3/1998 | Osborne | 222/55 |
| 5,871,121 A | * | 2/1999 | Hashimoto et al. | 222/54 |
| 2006/0011650 A1 | * | 1/2006 | Gomi | 222/23 |
| 2006/0016512 A1 | * | 1/2006 | Takano et al. | 141/82 |

(Continued)

FOREIGN PATENT DOCUMENTS
FR 2 619 802 A1 3/1989
WO WO 01/52621 A2 7/2001

OTHER PUBLICATIONS

Search Report issued Aug. 1, 2011 in the corresponding Application No. PCT/JP2007063961 (5 pages).

(Continued)

*Primary Examiner* — Kevin P Shaver
*Assistant Examiner* — Andrew P Bainbridge
(74) *Attorney, Agent, or Firm* — Stites & Harbison PLLC; Juan Carlos A. Marquez, Esq.

(57) ABSTRACT

A beverage dispenser has gauges to measure the temperature of the beverage, in at least one embodiment beer, stored in a closed beverage container. The beverage is pressurized and a pressure gauge in the gas supply conduit line measures the pressure of the gas in the beverage container. A pressure regulator in the gas supply conduit line assists in ensuring that the pressure is consistent. The valve is closed during dispensation and the temperature and the gas pressure are measured immediately afterwards. By calculating the temperature change of the beverage and the pressure drop in the container, the amount of beverage can be calculated accurately. This in turn can be utilized to reliably calculate how beverage is left in the container and this information is then presented on a display, in at least one embodiment, as a series of indicator bars.

16 Claims, 7 Drawing Sheets

OTHER PUBLICATIONS

Preliminary Report on Patentability from the International Bureau mailed Jan. 29, 2009 of PCT/JP2009/063961.

International Search Report of PCT/JP2007/063961 mailed Oct. 23, 2007.

* cited by examiner

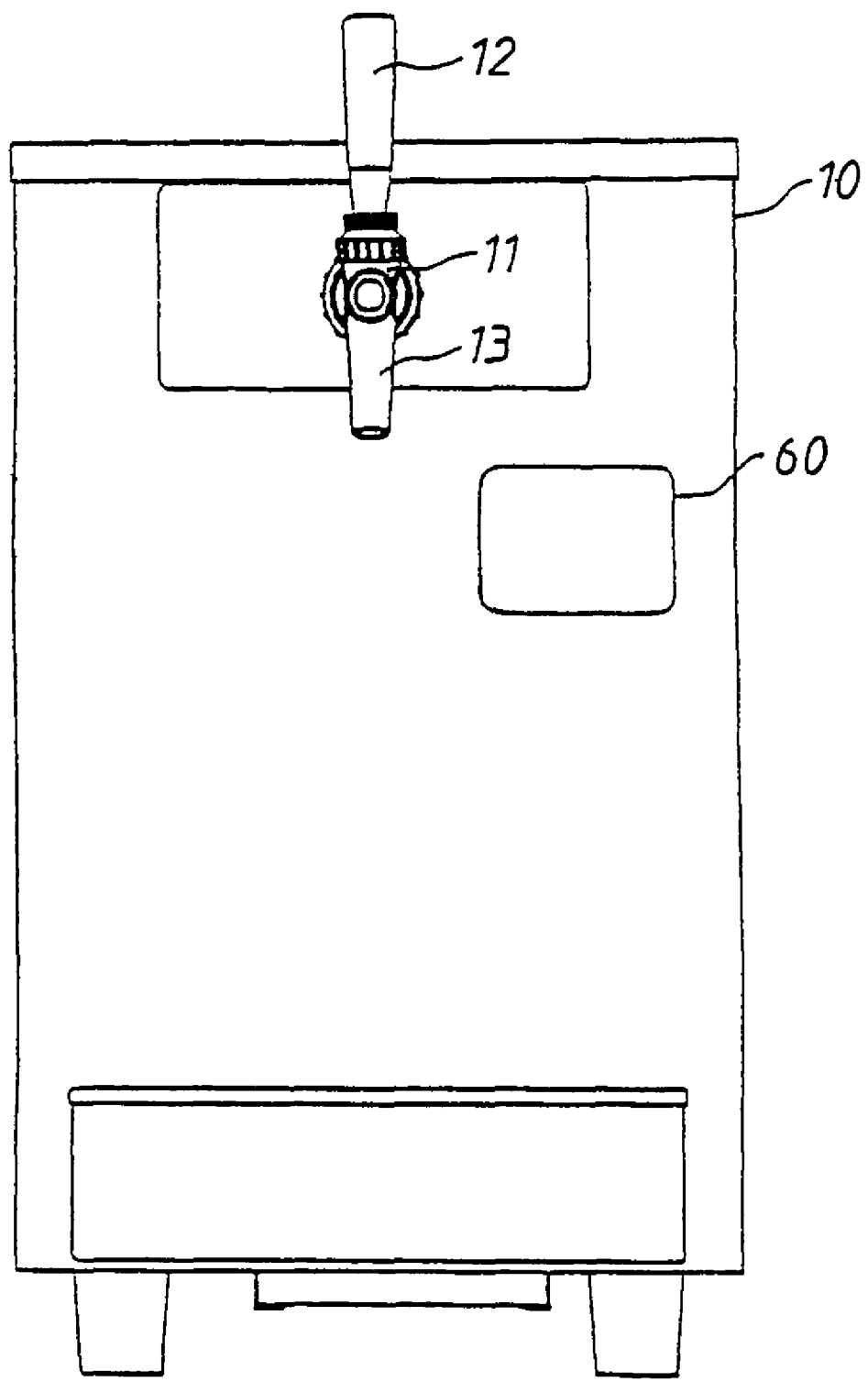

BEVERAGE DISPENSING APPARATUS

FIELD OF THE INVENTION

The present invention relates to a beverage dispensing apparatus, particularly to an apparatus for dispensing beverage such as beer under predetermined pressure.

DISCUSSION OF THE PRIOR ART

Disclosed in Japanese Patent Laid-open Publication No. 2005-274204 is a beverage dispensing apparatus wherein an amount of beer stored in a beer barrel is supplied to a beverage supply conduit under pressure of carbonic acid gas from a gas cylinder and is cooled by a cooling coil to be dispensed from a faucet in connection to the beverage supply conduit. In the beverage dispensing apparatus, a pressure regulator is provided for adjustment of the supply pressure of carbonic acid gas to avoid excessive supply of beer from the barrel under the pressure of carbonic acid gas and to avoid obstacle in supply of the beer caused by shortage of the supply of carbonic acid gas.

In the beverage dispensing apparatus, a flow quantity measurement device is provided to measure an amount of beer flowing through the beverage supply conduit thereby to confirm an amount of beer remained in the barrel. The flow quantity measurement device is constructed to measure a propagation time of an ultrasonic wave between a pair of mutually opposed ultrasonic oscillators placed outside a conduit inclined from an upstream to a downstream at a portion of the beverage supply conduit. The flow quantity measurement device is, however, complicated in construction and is not suitable for mass production because of high manufacturing cost. In addition, contaminants accumulate at the attachment place of the ultrasonic oscillators.

SUMMARY OF THE INVENTION

It is, therefore, an object of the present invention to provide a beverage dispensing apparatus wherein an amount of beverage remained in a beverage container is reliably measured and indicated without the provision of the conventional flow amount measurement device in the beverage supply conduit as described above.

According to the present invention, the object is accomplished by providing a beverage dispensing apparatus comprising beverage temperature measurement means for measuring a temperature of beverage stored in a closed beverage container, pressure measurement means disposed in a gas supply conduit supplying gas into the beverage container from a source of pressurized gas for measuring a gas pressure in the beverage container, a pressure regulator valve disposed in the gas supply conduit for regulating the pressure of gas supplied to the beverage container, discharge means for discharging an amount of beverage supplied thereto from a beverage supply conduit connected to the beverage container, wherein the pressure regulator valve is opened and closed in such a manner that the gas pressure in the container becomes a proper pressure calculated in accordance with a temperature of beverage measured by the temperature measurement means, wherein the beverage dispensing apparatus further comprises gas flow amount measurement means disposed in the gas supply conduit at a downstream of the pressure regulator valve for measuring a flow amount of gas supplied to the beverage container, calculation means for calculating an amount of beverage remained in the container or discharged from the container on a basis of the flow amount of gas measured by the gas flow amount measurement means, and display means for indicating the calculated amount of beverage remained in the container or discharged from the container.

In the beverage dispensing apparatus described above, an amount of gas supplied to the beverage container is measured by the gas flow amount measurement means without directly measuring the amount of beverage discharged from the container, and an amount of beverage remained in the container or discharged from the container is calculated on a basis of the measured flow amount of gas. With such calculation, the amount of beverage remained in the container or discharged from the container is accurately indicated on a display portion of the display means without being affected by bubbles appearing in the beverage when the beverage is foamy beverage such as beer. As the gas flow amount measurement means is provided to measure a flow amount of gas regulated to a proper pressure at the downstream of the pressure regulator valve, a measurement instrument of low pressure resistance can be adapted to measure the flow amount of gas.

In a practical embodiment of the present invention, it is preferable that the gas flow amount measurement means comprises means for measuring a mass flow rate of gas supplied to the beverage container per a unit time. In such an embodiment, means for measuring a temperature of gas supplied to the beverage container through the gas supply conduit is provided so that the calculation means acts to correct the measured mass flow rate in accordance with a gas pressure measured by the pressure measurement means and a gas temperature measured by the gas temperature measurement means for calculating an amount of beverage remained in the container or discharged from the container. In such an instance, the flow amount measured as the mass of gas is corrected in accordance with the pressure and temperature of gas to accurately calculate the amount of beverage remained in the container or discharged from the container.

DESCRIPTION OF THE PREFERRED EMBODIMENT

Hereinafter, a preferred embodiment of a beverage dispensing apparatus according to the present invention will be described with reference to the accompanying drawing. The beverage dispensing apparatus 10 is provided therein with a beverage supply conduit 50 connected to a beer barrel T which is supplied with carbonic acid gas from a gas cylinder G. A faucet or tap 11 is mounted to an upper portion of the front panel of the beverage dispensing apparatus for pouring an amount of beer from the beverage supply conduit 50. The gas cylinder G is provided with a pressure regulator valve for regulating the pressure of carbonic acid gas to a predetermined pressure (0.6 MPa (abs)). The faucet 11 includes a valve mechanism that is operated by a manual lever 12 to permit discharge of the beer supplied from the beer barrel T through the beverage supply conduit 50. The beer is poured from nozzles 13 of the faucet 11 in a liquid condition and a bubble condition.

As shown in FIG. 1, the beverage dispensing apparatus 10 has a cooling water tank 20 installed therein to store an amount of cooling water for cooling the beer supplied from the barrel T through the beverage supply conduit 50 and a freezing device 30 for circulating refrigerant through a coiled evaporator 31 mounted within the water tank 20. In operation of the freezing device 30, the water stored in tank 20 is cooled by ice formed on the periphery of coiled evaporator 31.

As shown in FIG. 1, a gas conduit 40 is housed in the rear portion of the housing of beverage dispensing apparatus 10 to supply the carbonic acid gas into the beer barrel T from the gas cylinder G. Disposed in the gas conduit 40 are a pressure regulator valve 41, a gas pressure sensor 42, a gas flow sensor 43, a gas temperature sensor 44 in sequence from an upstream of the flow of gas. The gas conduit 40 is connected at its inlet end 40*a* to a conduit G1 for supply of carbonic acid gas from the gas cylinder G and is connected at its outlet end 40*b* to a conduit G2 for supply of the carbonic acid gas to the beer barrel T. The pressure regulator valve 41 is in the form of an electromagnetic valve to permit supply of the carbonic acid gas to the beer barrel T from the gas cylinder G when it is opened and to block supply of the carbonic acid gas to the beer barrel T when it is closed. The gas pressure sensor 42 is disposed in the gas conduit 40 at the downstream of the pressure regulator valve 41 to measure the pressure of carbonic acid gas supplied to the beer barrel T.

The gas flow sensor 43 is in the form of a mass flow rate sensor of the thermal type (MEMS flow sensor element made by Omuron Corporation) which is composed of a pair of thermopiles arranged at opposite sides of a heater. When the thermopiles received the flow of carbonic acid gas, the temperature of gas becomes lower at the windward of the heater and becomes higher at the leeward of the heater. Thus, a difference of the temperatures is detected as a difference of electromotive forces of thermopiles. When the difference of electromotive forces is detected, the flow rate of carbonic acid gas is measured in mass in a standard pressure condition (atmospheric pressure: 0.1013 MPa (abs) at a temperature (0°). In this embodiment, the flow rate of carbonic acid gas flowing through the gas conduit 40 per a unit time is measured in mass. Although the mass flow sensor was used as the gas flow sensor 43 in this embodiment, another gas flow sensor, for example, a mass flow sensor of the Coriolis type may be used as the gas flow sensor. The gas temperature sensor 44 is disposed in the gas conduit 40 at the downstream of gas flow sensor 43 to detect the temperature of carbonic acid gas supplied to the beer barrel T from the gas cylinder G.

The beverage supply conduit 50 is connected at its inlet end 50*a* to a conduit T1 for supply of the beer from barrel T and is connected at its outlet end 50*b* to the faucet 11. Disposed in the beverage supply conduit 50 are a beverage temperature sensor 51 and a liquid sensor 52 in sequence from the upstream of the flow of beer. The beverage temperature sensor 51 is provided to detect the temperature of beer supplied from barrel T. The temperature of beer detected by sensor 51 is deemed as the temperature of beer in barrel T. The liquid sensor 52 is provided to detect the flow of beer supplied through the beverage supply conduit 50 from the barrel T and to detect short of beer in the barrel T. An intermediate portion of beverage supply conduit 50 is in the form of a coiled cooling portion 53 housed in the water tank 20.

As shown in FIG. 2, the beverage dispensing apparatus 10 is provided at its front with a display portion 60 having a plurality of parallel indication segments for displaying a calculated cumulative amount of beer discharged from the faucet 11 as shown in FIG. 3(*a*) or 3(*b*). In FIG. 3(*a*), nine segments indicate the fact that a calculated cumulative amount of beer discharged from the barrel T is about 5 liter. In such a manner, a discharged amount of beer is indicated by the number of segments on the display portion 60. Alternatively, an amount of beer remained in barrel T may be displayed by a plurality of parallel indication segments as shown in FIG. 3(*c*) or 3(*d*). In this case, the number of indication segments decreases in accordance with discharge of beer from barrel T.

As shown in FIG. 4, the beverage dispensing apparatus is provided with an electric controller E including a microcomputer 70 connected to sensors 42, 43,44, 51, 52 and to the pressure regulator valve 41 and the display portion 60. As shown in FIG. 4, the computer comprises a memory 71 which stores a map for defining a proper pressure of carbonic acid gas to be filled in the beer barrel T in accordance with the temperature of beer in barrel T, processing means for calculating the proper pressure of carbonic acid gas based on the map in accordance with the temperature of beverage detected by sensor 51, and control means for controlling open-and-close of the pressure regulator valve 41 in such a manner that the pressure of carbonic acid gas detected by sensor 42 becomes the proper pressure calculated by the processing means. The computer 70 further includes calculation means for correcting a mass flow rate of carbonic acid gas detected by gas flow sensor 43 in accordance with the pressure of carbonic acid gas detected by pressure sensor 42 and the temperature of carbonic acid gas detected by sensor 44 and for calculating an amount of beer discharged from barrel T on a basis of the correction of the mass flow rate of carbonic acid gas, and processing means for indicating the calculated cumulative amount of beer on the display portion 60.

When a power switch (not shown) of the beverage dispensing apparatus is turned on, the freezing device 30 is activated to cool the water in cooling water tank 20. Assuming that the temperature of beverage detected by sensor 51 is 15° C., the pressure of carbonic acid gas supplied from the gas cylinder G is regulated to about 0.30 Mpa (abs). When the manual lever 12 of faucet 11 is operated to pour the cold beer from the beverage supply conduit 50, the pressure in the beer barrel T becomes lower. In such an instance, the pressure regulator valve 41 is opened under control of computer 70 in response to a detection signal of the gas pressure sensor 42 to permit supply of carbonic acid gas into the beer barrel T from the gas cylinder G and is controlled by the processing means of computer 70 to regulate the pressure of carbonic acid gas in the beer barrel T to a proper pressure in accordance with the temperature of beverage detected by sensor 51 on a basis of the map stored in the memory of computer 70.

When the carbonic acid gas is supplied into the beer barrel T from the gas cylinder G in operation described above, the gas flow sensor 43 detects a flow amount of carbonic acid gas supplied into the beer barrel T through the gas conduit 40 per a unit time and applies the detection value to the computer. The detection value of the gas flow sensor 43 is measured in mass of the flow under the standard pressure (atmospheric pressure) at the standard temperature (0° C.), and the pressure of carbonic acid gas supplied to the beer barrel T is regulated to a proper pressure in accordance with the internal temperature of beer barrel T. As a result, the calculation means of computer 70 corrects the detection value of gas flow sensor 43 on a basis of the following formula and calculates a discharge amount V2 of beer.

$$V2 = V1 \times P1/P2 \times T2/T1 \quad (1)$$

In this formula, V1 is the detection value of gas flow sensor 43 converted in volume, P1 is the standard pressure (atmospheric pressure), P2 is a detection value of gas pressure sensor 42, T1 is the standard temperature 0° C. (273.2 K), and T2 is a detection value of gas temperature sensor 44. With the formula, the flow amount of carbonic acid gas can be calculated by multiplication of the detection value V1 of gas flow sensor 43 with a pressure correction coefficient obtained by division of the standard pressure P1 with the detection value P2 of carbonic acid gas and a temperature correction coefficient obtained by division of the detection temperature T2 of carbonic acid gas with the standard temperature T1.

Assuming that the flow amount V1 of carbonic acid gas measured by gas flow sensor 43 during lapse of 2.5 minutes as shown by the reference character a is calculated as about 15 liter, the calculated flow amount V1 is corrected by the following equation to calculate a discharge amount V2 of the beer as the same amount of beer actually measured.

$$V2=15\times 0.1013/0.30\times 288/273.2=5.3$$

Assuming that the temperature of beverage detected by sensor 51 has risen from 15° C. to 27° C. in a condition where the beer is not discharged, the pressure regulator valve 41 is opened and closed under control of the processing means of computer 70 in such a manner that the pressure of carbonic acid gas in the beer barrel T becomes a proper pressure 0.42 MPa (abs) in accordance with rise of the temperature of beverage detected by sensor 51. As a result, the carbonic acid gas is supplied to the beer barrel T through the gas conduit 40 as shown by the reference character b in FIG. 6, and the flow amount of carbonic acid gas is measured by the gas flow sensor 43. In such an instance, the flow amount of carbonic acid gas measured by the gas flow sensor 43 becomes about 15 liter before lapse of 4.5 minutes and becomes about 21 liter after lapse of 5 minutes. Thus, the amount of carbonic acid gas measured by the gas flow sensor 43 is corrected by the formula (1) as described below to calculate a discharge amount V2 of beer from barrel T.

Discharge amount of beer before about 4.5 minutes:

$$V2=15\times 0.1013/0.30\times 288/273.2=5.3$$

Discharge amount of beer after 5 minutes:

$$V2=21\times 0.1013/0.42\times 300/273.2=5.5$$

When the faucet 11 is operated to pour the beer in a condition where the gas pressure in barrel T is 0.42 MPa (abs), the flow amount of carbonic acid gas measured by sensor 43 after lapse of 9 minutes is calculated as about 42 liter as shown by the reference character c. Accordingly, the discharge amount V2 of beer from barrel T is calculated by correction described below on a basis of the formula (1).

$$V2=42\times 0.1013/0.41\times 293/273.2=11.1$$

The cumulative discharge amount of beer calculated as described above is approximately the same amount actually measured.

When the pressure regulator valve 41 is closed under control of the computer 70 to restrict the supply of carbonic acid gas to the beer barrel T so that the pressure detected by sensor 42 decreases from 0.30 MPa (abs) to 0.25 MPa (abs) in accordance with the temperature of beer detected by sensor 51 in a condition where the faucet 11 is being operated to pour the beer, the flow amount of carbonic acid gas may not be measured by the gas flow sensor 43 as shown by the reference character d in FIG. 7. In such an instance, the flow amount of carbonic acid gas measured before 4.5 minutes is calculated as about 28 liter and is also calculated as 28 liter after lapse of 5.5 minutes. Accordingly, the discharge amount V2 of the beer from barrel T is calculated by correction based on the foregoing formula (1) as described below.

Discharge amount of beer before 4.5 minutes:

$$V2=28\times 0.1013/0.30\times 288/273.2=9.9$$

Discharge amount of beer after about 5.5 minutes:

$$V2=28\times 0.1013/0.25\times 288/273.2=11.9$$

The cumulative discharge amount of beer calculated as described above is approximately the same amount as that actually measured even when the flow amount of carbonic acid gas may not be measured by the gas flow sensor 43 in a condition where the carbonic acid gas is not supplied to the gas conduit 40 to decrease the pressure in beer barrel T.

As is understood from the above description, the flow amount of carbonic acid gas supplied to the beer barrel T is measured by the gas flow sensor 43, and the discharge amount of beer from barrel T is calculated on a basis of the measured flow amount of carbonic acid gas or the calculated discharge amount of beer is subtracted from the initial amount of beer stored in barrel T to calculate an amount of beer remained in barrel T thereby to indicate the discharge amount or remained amount of beer on the display portion 60 as shown in FIG. 3.

Although in the foregoing embodiment, the beverage temperature sensor 51 has been provided in the beverage supply conduit 51 to detect the temperature of beer in barrel T, a temperature sensor for detection of an ambient temperature of the beer barrel T may be provided to calculate the temperature of beer in barrel T by conversion of its detection value. In addition, the plurality of segments for indication of an amount of beer discharged from barrel T or remained in barrel T may be substituted for another display visible at a glance.

BRIEF DESCRIPTION OF THE DRAWINGS

In the drawings:

FIG. 2 is a front view of the beverage dispensing apparatus shown in FIG. 1;

Figure 1:
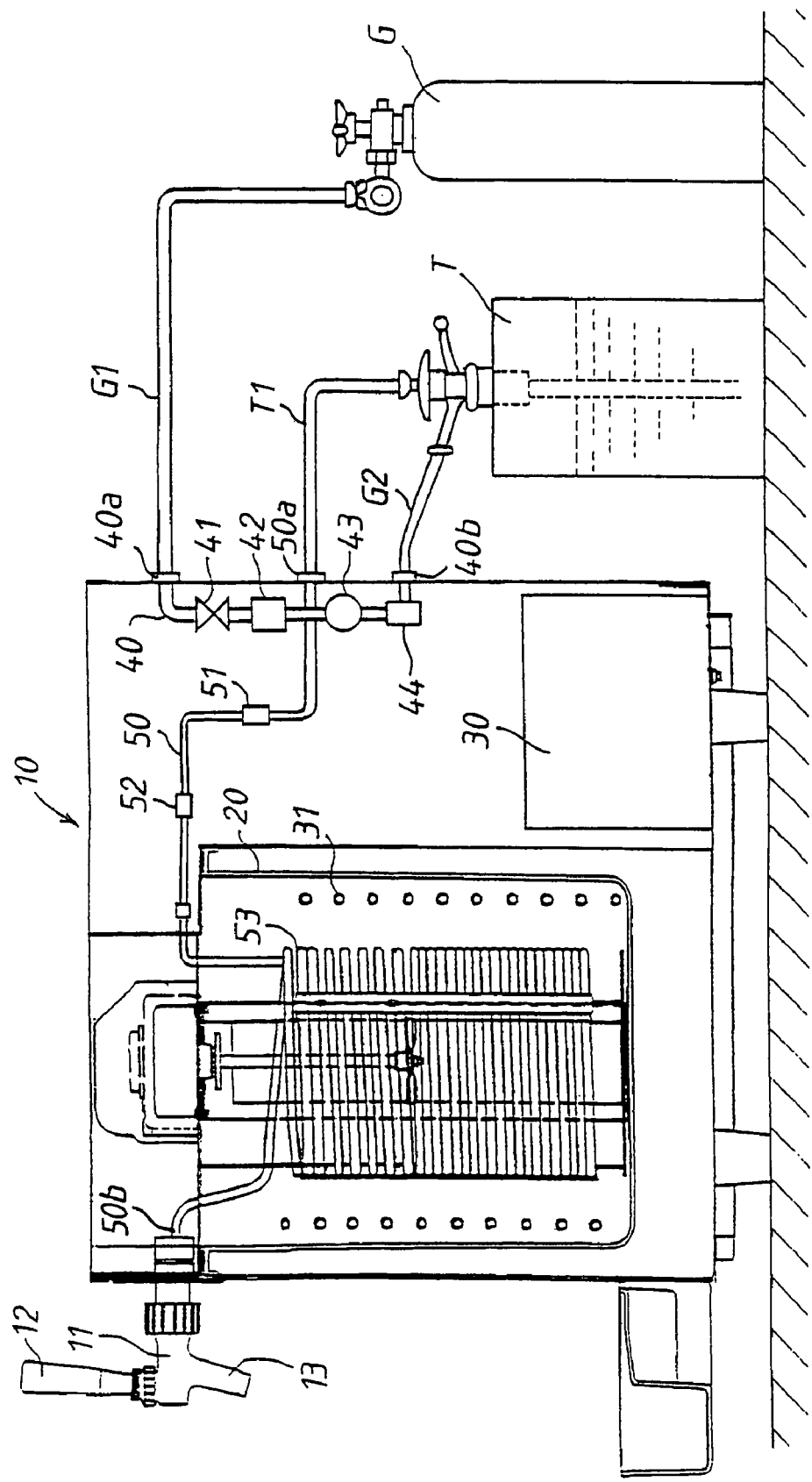
FIG. 1 is a side view of a beverage dispensing apparatus according to the present invention.
Figure 3A:
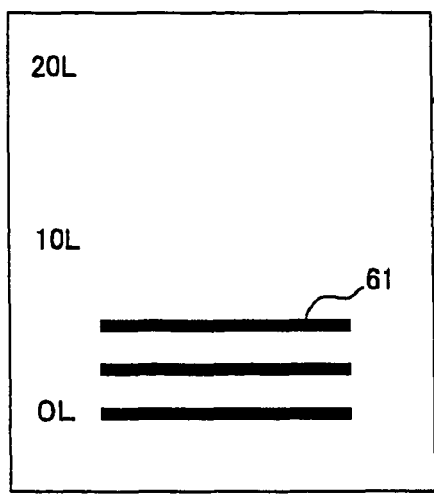
FIG. 3 is a view of indication on a display portion of the beverage dispensing apparatus shown in FIG. 1.
Figure 3B:
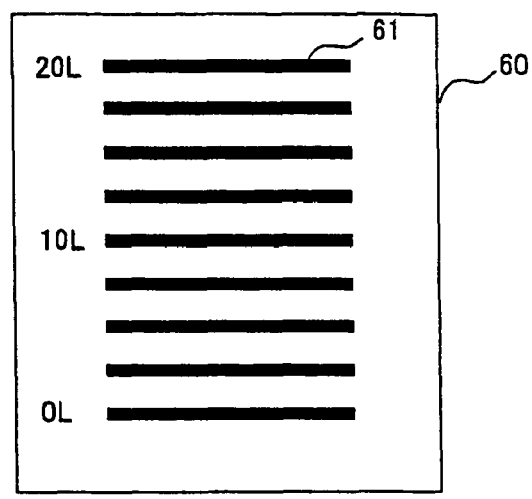
Figure 3C:
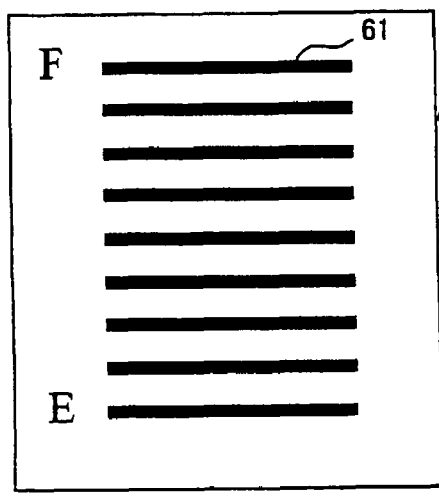
Figure 3D:
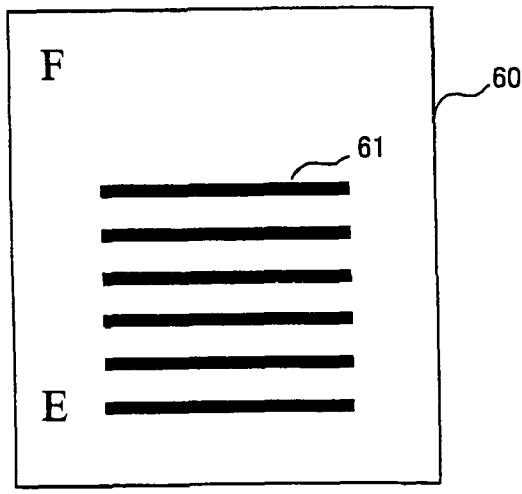
Figure 4:
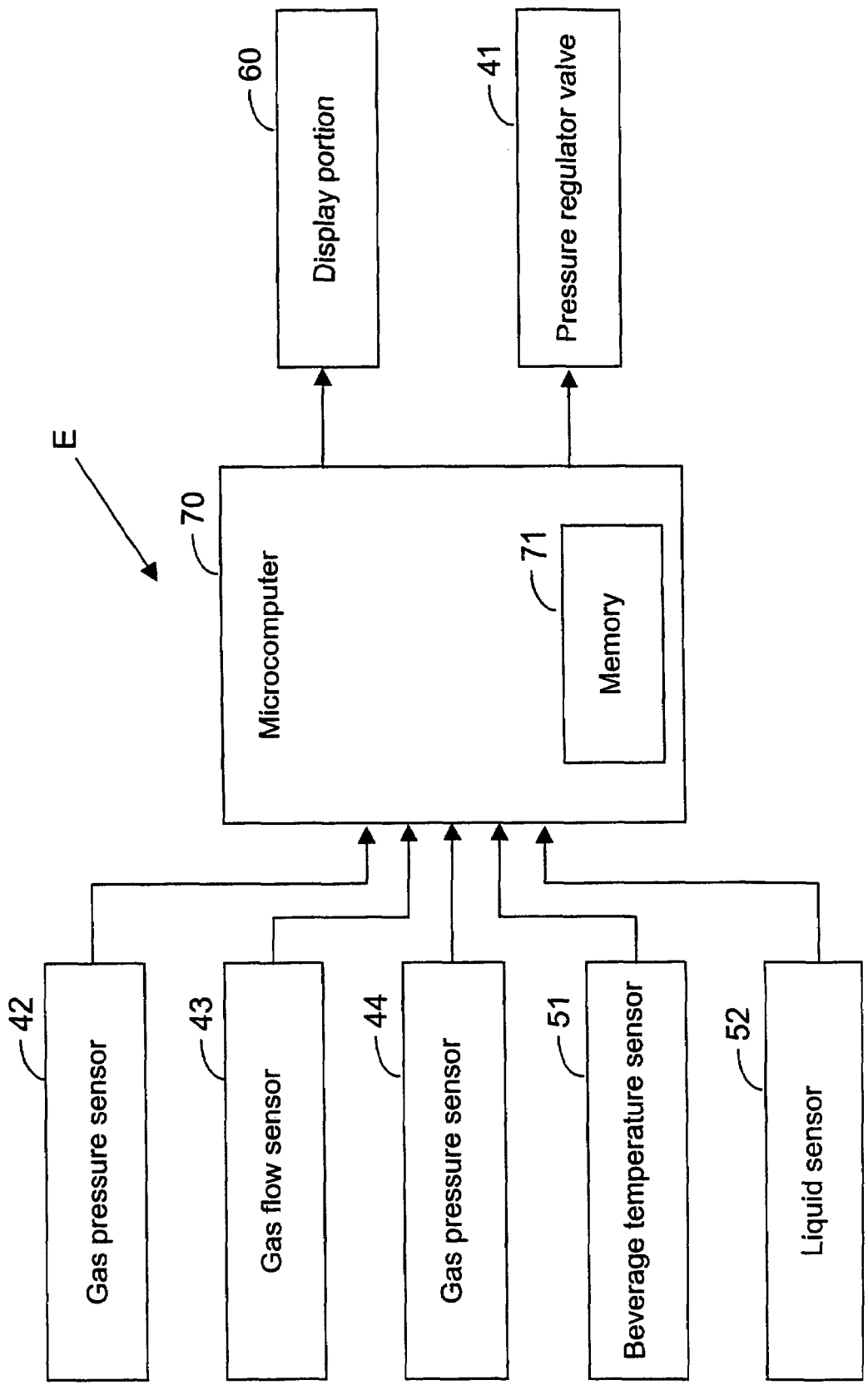
FIG. 4 is a block diagram of an electric control apparatus for the beverage dispensing apparatus shown in FIG. 1.
Figure 5:
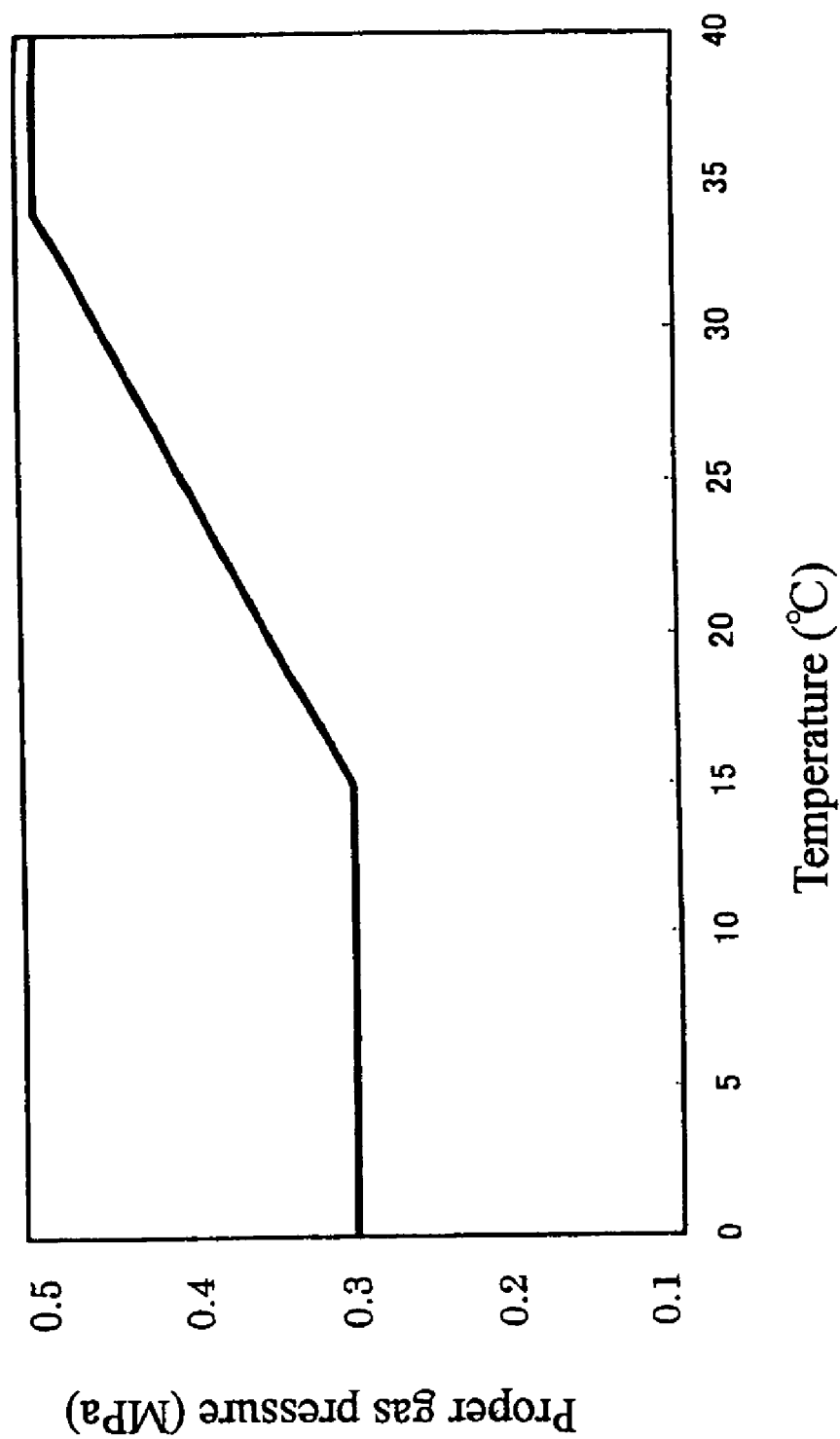
FIG. 5 is a graph showing a proper gas pressure in a beer barrel.
Figure 6:
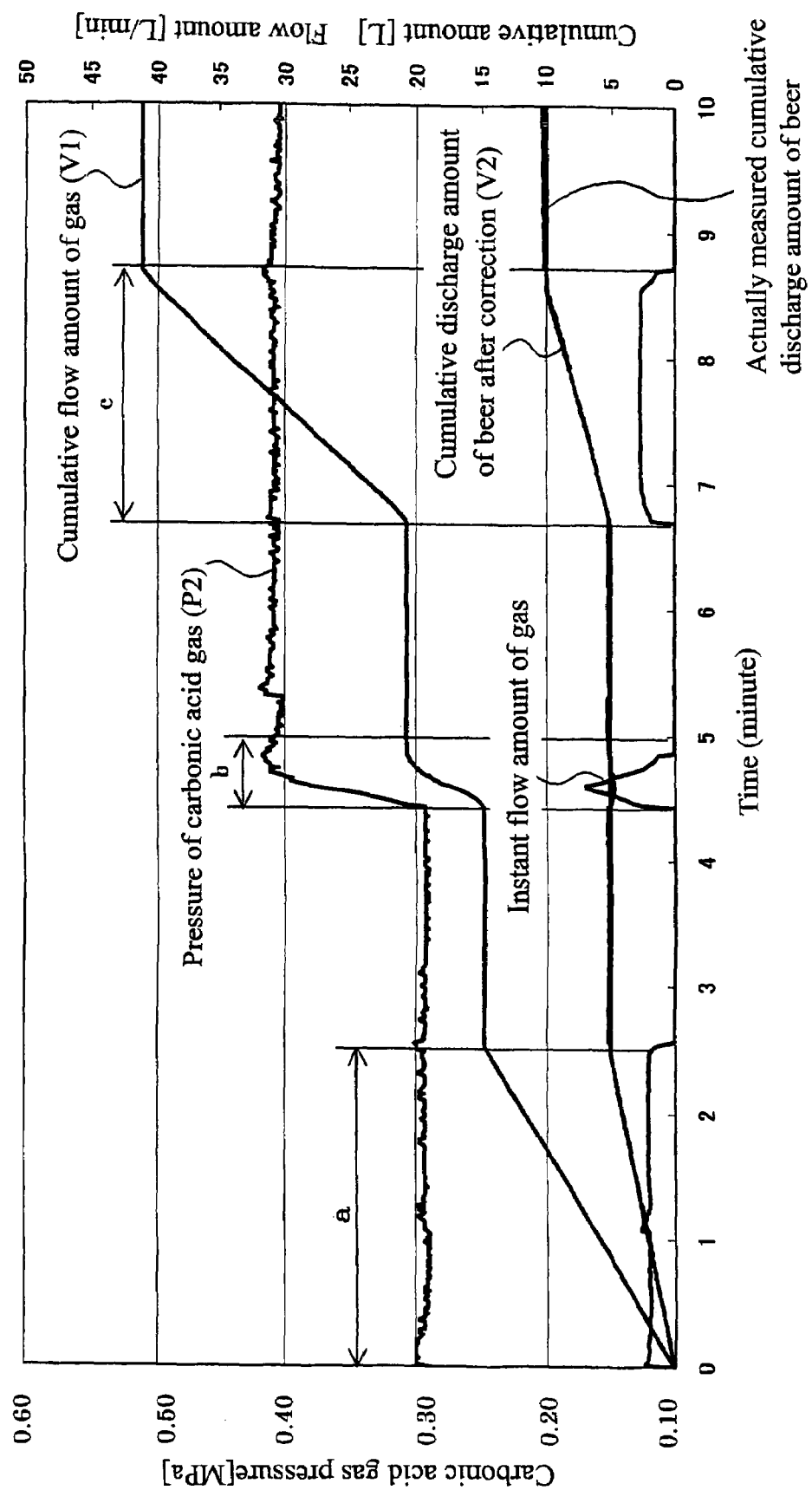
FIG. 6 is a graph showing a relationship between a calculated flow amount of carbonic acid gas detected by a gas flow sensor in the beverage dispensing apparatus and a calculated discharge amount of beer after correction.
Figure 7:
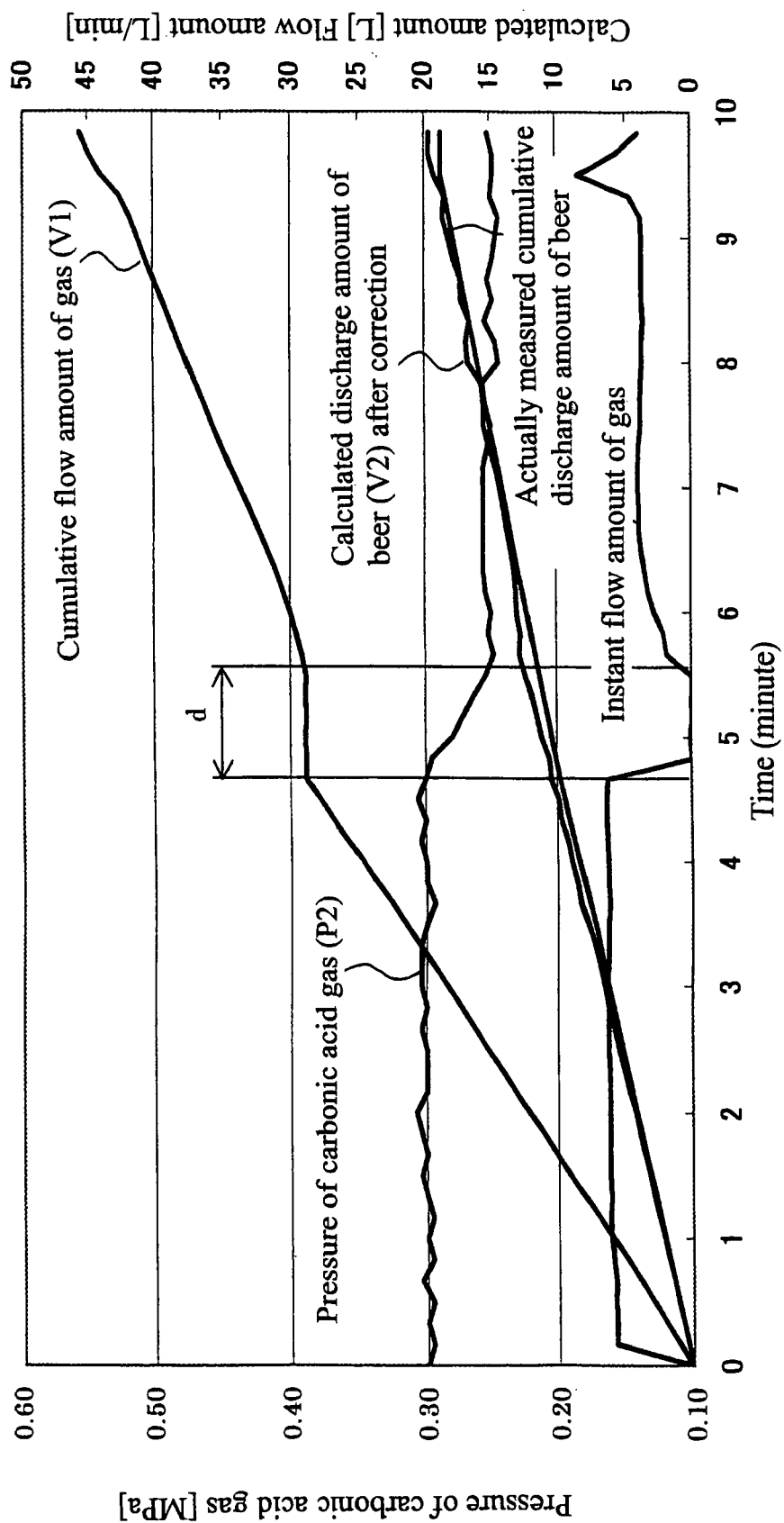
FIG. 7 is a graph showing a relationship between a calculated flow amount of carbonic acid gas detected by a gas flow sensor in the beverage dispenser and a calculated discharge amount of beer after correction.

The invention claimed is:
1. A beverage dispenser comprising:
beverage temperature measurement means for measuring a temperature of beverage stored in a closed beverage container;
pressure measurement means disposed in a gas supply conduit supplying gas into the beverage container from a source of pressurized gas for measuring a gas pressure in the beverage container;
a pressure regulator valve disposed in the gas supply conduit for regulating the pressure of gas supplied to the beverage container;
discharge means for discharging an amount of beverage supplied thereto from a beverage supply conduit connected to the beverage container;
wherein the pressure regulator valve is opened and closed in such a manner that the gas pressure in the container becomes a proper pressure calculated in accordance with a temperature of the beverage measured by the temperature measurement means,
wherein the beverage dispensing apparatus further comprises:
gas flow measurement means disposed in the gas supply conduit at a downstream of the pressure regulator valve for measuring a flow amount of gas supplied to the beverage container;

calculation means for calculating an amount of beverage remained in the container or discharged from the container on a basis of the flow amount of gas measured by the gas flow rate measurement means; and display means for indicating the calculated amount of beverage remained in the container or discharged from the container.

2. A beverage dispenser as claimed in claim 1, wherein said gas flow measurement means comprises means for measuring a mass flow rate of gas supplied to the beverage contain per a unit time, and wherein gas temperature measurement means for measuring
a temperature of gas supplied to the beverage container through the gas supply conduit is provided so that said calculation means corrects the measured mass flow rate in accordance with a gas pressure measured by said pressure measurement means and a gas temperature measured by said gas temperature measurement means and calculates the remained amount or discharged amount of beverage.

3. A beverage dispenser as claimed in claim 1, wherein said beverage temperature measurement means is provided in the beverage supply conduit connected to the beverage container.

4. A beverage dispenser as claimed in claim 1, wherein said beverage temperature measurement means comprises
temperature measurement means for measuring an ambient temperature of the beverage container, and
means for converting a temperature measured by said temperature measurement means to a temperature of the interior of the beverage container.

5. A beverage dispenser as claimed in claim 1, wherein said display means comprises a plurality of segments for indicating the remained amount or discharged amount of beverage calculated by said calculation means, wherein the indicated segments are decreased in accordance with a discharge amount of beverage so that an amount of beverage remained in the container can be visually recognized by the user.

6. A beverage dispenser as claimed in claim 2, wherein said beverage temperature measurement means is provided in the beverage supply conduit connected to the beverage container.

7. A beverage dispenser as claimed in claim 2, wherein said beverage temperature measurement means comprises
temperature measurement means for measuring an ambient temperature of the beverage container, and
means for converting a temperature measured by said temperature measurement means to a temperature of the interior of the beverage container.

8. A beverage dispenser as claimed in claim 3, wherein said beverage temperature measurement means comprises
temperature measurement means for measuring an ambient temperature of the beverage container, and
means for converting a temperature measured by said temperature measurement means to a temperature of the interior of the beverage container.

9. A beverage dispenser as claimed in claim 6, wherein said beverage temperature measurement means comprises
temperature measurement means for measuring an ambient temperature of the beverage container, and
means for converting a temperature measured by said temperature measurement means to a temperature of the interior of the beverage container.

10. A beverage dispenser as claimed in claim 2, wherein said display means comprises a plurality of segments for indicating the remained amount or discharged amount of beverage calculated by said calculation means, wherein the indicated segments are decreased in accordance with a discharge amount of beverage so that an amount of beverage remained in the container can be visually recognized by the user.

11. A beverage dispenser as claimed in claim 3, wherein said display means comprises a plurality of segments for indicating the remained amount or discharged amount of beverage calculated by said calculation means, wherein the indicated segments are decreased in accordance with a discharge amount of beverage so that an amount of beverage remained in the container can be visually recognized by the user.

12. A beverage dispenser as claimed in claim 6, wherein said display means comprises a plurality of segments for indicating the remained amount or discharged amount of beverage calculated by said calculation means, wherein the indicated segments are decreased in accordance with a discharge amount of beverage so that an amount of beverage remained in the container can be visually recognized by the user.

13. A beverage dispenser as claimed in claim 4, wherein said display means comprises a plurality of segments for indicating the remained amount or discharged amount of beverage calculated by said calculation means, wherein the indicated segments are decreased in accordance with a discharge amount of beverage so that an amount of beverage remained in the container can be visually recognized by the user.

14. A beverage dispenser as claimed in claim 7, wherein said display means comprises a plurality of segments for indicating the remained amount or discharged amount of beverage calculated by said calculation means, wherein the indicated segments are decreased in accordance with a discharge amount of beverage so that an amount of beverage remained in the container can be visually recognized by the user.

15. A beverage dispenser as claimed in claim 8, wherein said display means comprises a plurality of segments for indicating the remained amount or discharged amount of beverage calculated by said calculation means, wherein the indicated segments are decreased in accordance with a discharge amount of beverage so that an amount of beverage remained in the container can be visually recognized by the user.

16. A beverage dispenser as claimed in claim 9, wherein said display means comprises a plurality of segments for indicating the remained amount or discharged amount of beverage calculated by said calculation means, wherein the indicated segments are decreased in accordance with a discharge amount of beverage so that an amount of beverage remained in the container can be visually recognized by the user.

* * * * *